United States Patent
Tran

(10) Patent No.: US 12,114,231 B2
(45) Date of Patent: *Oct. 8, 2024

(54) CONTENT NOTIFICATION USING A MULTI-DIMENSIONAL FABRIC INTERFACE

(71) Applicant: PEER INC, Bellevue, WA (US)

(72) Inventor: Thinh Tran, Bellevue, WA (US)

(73) Assignee: PEER INC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,753

(22) Filed: Nov. 7, 2022

(65) Prior Publication Data

US 2023/0064626 A1 Mar. 2, 2023

Related U.S. Application Data

(63) Continuation of application No. 17/749,852, filed on May 20, 2022.

(60) Provisional application No. 63/193,408, filed on May 26, 2021.

(51) Int. Cl.
*H04W 4/21* (2018.01)
*G06T 11/00* (2006.01)
*H04W 4/02* (2018.01)
*H04W 4/029* (2018.01)

(52) U.S. Cl.
CPC .............. *H04W 4/029* (2018.02); *G06T 11/00* (2013.01); *H04W 4/025* (2013.01)

(58) Field of Classification Search
CPC ............ G06Q 10/06311; G06Q 50/08; H04W 64/003; H04W 72/048; H04W 4/029; H04W 72/0453; H04W 36/32; H04W 64/006; H04W 74/0833; H04B 7/18506
See application file for complete search history.

(56) References Cited

U.S. PATENT DOCUMENTS

| 7,003,737 B2 | 2/2006 | Chiu et al. |
| 7,353,114 B1 * | 4/2008 | Rohlf ..................... G06F 40/143 |
| | | 702/5 |
| 8,930,132 B2 | 1/2015 | Vellaikal et al. |
| 10,817,898 B2 * | 10/2020 | Waldron ............ G06Q 30/0246 |
| 2006/0190442 A1 | 8/2006 | Limberger |
| 2008/0007554 A1 | 1/2008 | Kobayashi et al. |
| 2008/0102856 A1 | 5/2008 | Fortescue et al. |
| 2008/0183859 A1 | 7/2008 | Aaron |

(Continued)

FOREIGN PATENT DOCUMENTS

WO 2009/070841 A1 6/2009

OTHER PUBLICATIONS

International Search Report and Written Opinion for PCT Application No. PCT/US2022/30293, dated Aug. 17, 2022, 21 pages.

(Continued)

*Primary Examiner* — Phuoc H Doan
(74) *Attorney, Agent, or Firm* — Seed IP Law Group LLP

(57) ABSTRACT

An orthogonal or multi-dimensional fabric interface is described herein to select and present content to a user. A location is determined and time is selected for the user. The multi-dimensional fabric is accessed for content based the determined location and the selected time. If content is stored in the multi-dimensional fabric at the determined location and the selected time, the user is notified of the content, which can then be presented to the user.

20 Claims, 7 Drawing Sheets

(56) References Cited

U.S. PATENT DOCUMENTS

| | | |
|---|---|---|
| 2010/0023878 A1 | 1/2010 | Douris et al. |
| 2010/0070888 A1 | 3/2010 | Watabe et al. |
| 2010/0093365 A1 | 4/2010 | Bloebaum |
| 2011/0035284 A1 | 2/2011 | Moshfeghi |
| 2011/0040754 A1 | 2/2011 | Peto et al. |
| 2012/0110179 A1 | 5/2012 | Van Coppenolle et al. |
| 2012/0324018 A1 | 12/2012 | Metcalf et al. |
| 2013/0097563 A1 | 4/2013 | Velho et al. |
| 2013/0227449 A1 | 8/2013 | Brown |
| 2016/0286361 A1 | 9/2016 | Ciecko |
| 2017/0272394 A1 | 9/2017 | Ding et al. |
| 2018/0096524 A1 | 4/2018 | Ekambaram et al. |
| 2018/0276055 A1 | 9/2018 | Furuichi et al. |
| 2022/0004889 A1 | 1/2022 | Atkinson, III et al. |

OTHER PUBLICATIONS

International Search Report and Written Opinion for PCT Application No. PCT/US2022/30303, dated Aug. 17, 2022, 21 pages.

\* cited by examiner

CONTENT NOTIFICATION USING A MULTI-DIMENSIONAL FABRIC INTERFACE

TECHNICAL FIELD

The present application pertains to content presentation, and more particularly, to utilizing content stored in a multi-dimensional fabric to notify a user of content relevant to a location and time associated with the user.

BACKGROUND

Description of the Related Art

People routinely create and consume content in various ways. Typical content consumption relies on a user scrolling through a content feed from a social media platform. In some situations, the social media platform may push the content to the user when the content is posted to or becomes available on the social media platform, such as using a push notification mechanism. This type of content consumption, unfortunately, is often time-based such that it is presented in chronological order or it is popularity-based such that it is presented based on its popularity with other users. These types of content consumption, however, do not normally provide content to a user when the user may actually be interested in the content. Although some content may be provided to a user using demographic information, the user may not be interested in such content at that time. It is with respect to these and other considerations that the embodiments described herein have been made.

BRIEF SUMMARY

Briefly stated, embodiments are directed towards systems and methods that utilize a multi-dimensional fabric to obtain and present content to a user of a mobile computing device. Content is stored in the multi-dimensional fabric using a location associated with the content and a time associated with the content. As the user changes locations or as time changes, the multi-dimensional fabric is manipulated to determine if corresponding content is stored in the multi-dimensional fabric at the changed location and time. If so, a notification is presented to the user, and the content can be presented to the user. In this way, the user can be notified of content that is stored in the multi-dimensional fabric and relevant to the location and time associated with the user's mobile computing device.

The embodiments described in the present disclosure improve upon known data storage architectures, structures, processes, and techniques to present data to a user in a variety of different computerized technologies, such as operating systems, user interfaces, and social networks.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
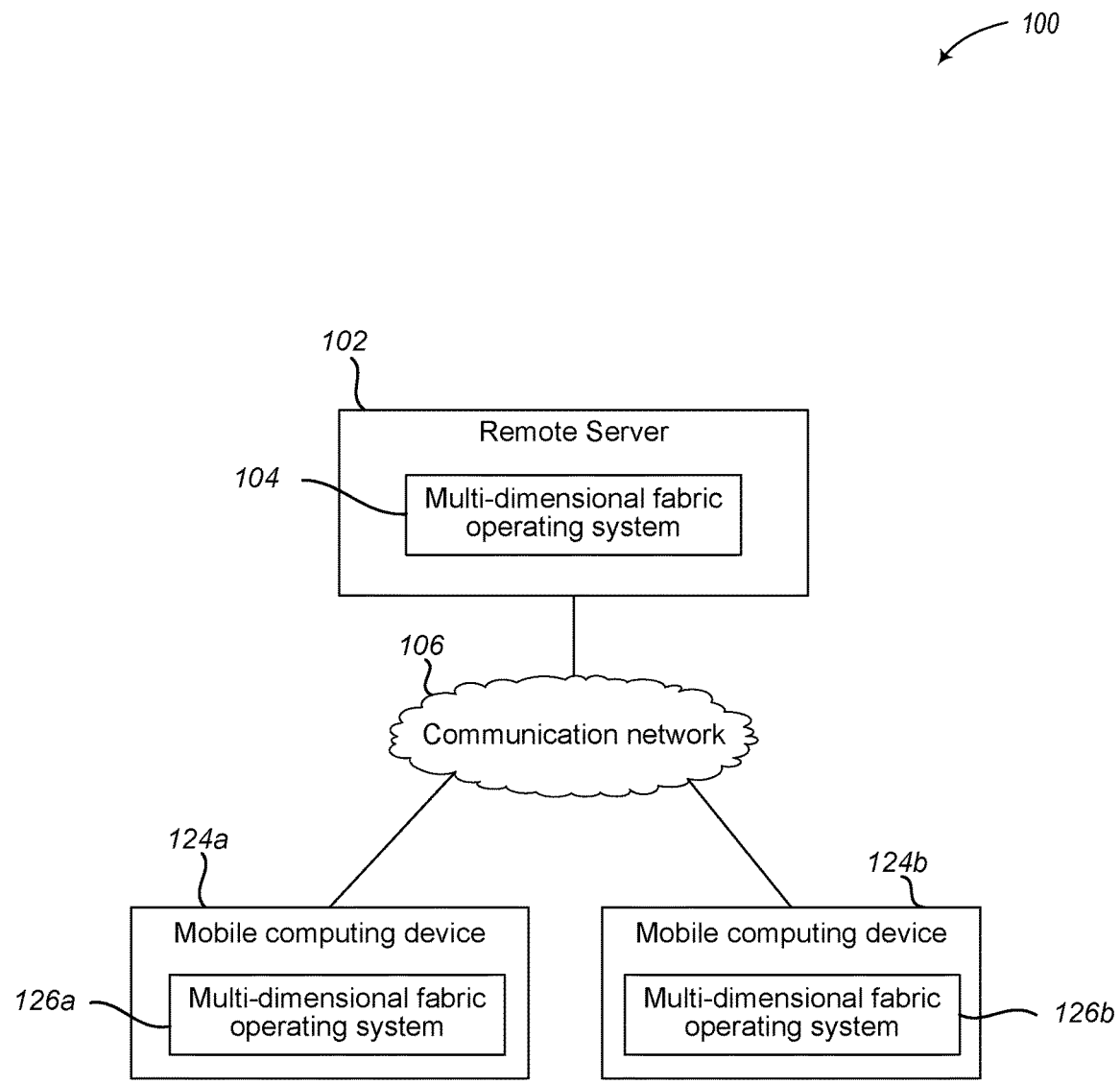
FIG. 1 illustrates a context diagram of an environment that provides content notification using content stored in a multi-dimensional fabric in accordance with embodiments described herein.

FIG. 1 illustrates a context diagram of an environment that presents content using content stored in a multi-dimensional fabric in accordance with embodiments described herein. In the illustrated example, environment 100 includes a remote server 102 and one or more mobile computing devices 124a-124b.

The remote server 102 is configured as a remote computing system, e.g., cloud computing resources, which implements or executes a multi-dimensional fabric operating system 104. In some embodiments, the multi-dimensional fabric may be implemented as an operating shell. In other embodiments, the functionality of the multi-dimensional fabric operating system 104 may be implemented as an application, module, or other software or hardware implementation. Accordingly, the environment and system described herein make it possible for content to be selected from a multi-dimensional fabric and presented to users of the mobile computing devices 124a-124b using a location and time associated with the mobile computing devices 124a-124b.

Figure 2:
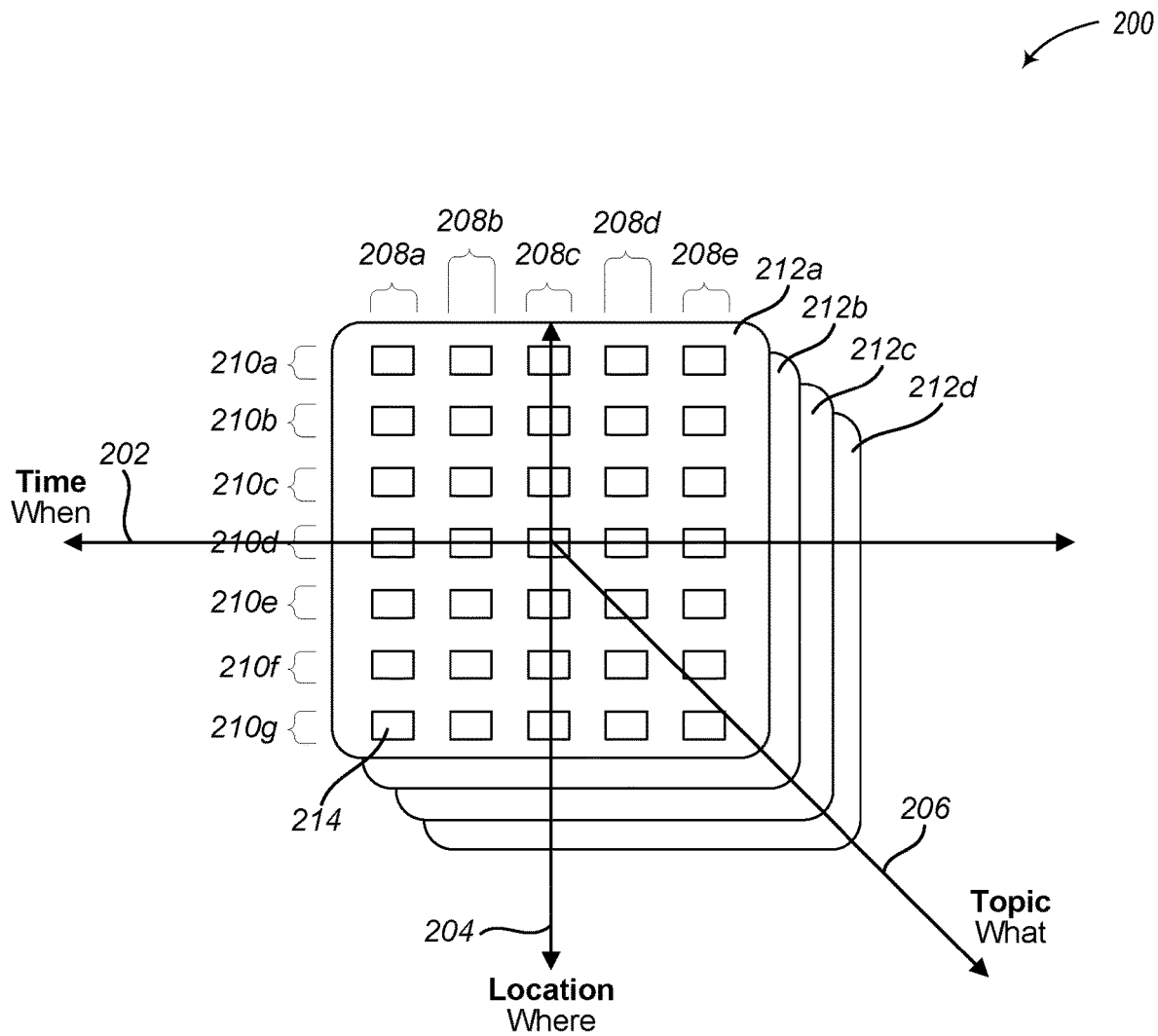
FIGS. 2 and 3 illustrate graphical representations of use case examples of a multi-dimensional fabric for storing content in accordance with embodiments described herein.

The multi-dimensional fabric operating system 104 stores content in a multi-dimensional fabric according to a plurality of different dimensions. In various embodiments, these dimensions include a location axis and a time axis. In other embodiments, these dimensions include a location axis, a time axis, and a topic axis. Four or more dimensions or other types of dimensions may also be used. One example of a multi-dimensional fabric is shown in FIG. 2.

The time axis in which the content is stored may be based on when the content was captured by the user, when it was stored by the remote server 102 (e.g., a time stamp added to a picture when the picture was captured or a time stamp when the picture was uploaded to the remote server), or a time input by a user. The location axis in which the content is stored may be based on where the content was captured by the user (e.g., the location of the camera that captured the picture or a location of a display device used to upload the picture from the camera to the remote server) or a location input by the user. The topic axis in which the content is stored may be based what the content is about (e.g., food, clothing, entertainment, transportation, etc.), which may be input by a user or determined using one or more machine learning algorithms that are trained to identify different topics of content.

The content may be stored on a single memory or on a plurality of memories. Likewise, the content may be stored by a single computing device or by a plurality of computing devices. In various embodiments, the content is stored as a network of content arranged by two or more dimensions (e.g., time and location) to form a spatial web of content.

Depending on the granularity of the time and location axes (e.g., minutes compared to hours or GPS coordinates compared to zip code), there are a finite number of pieces of content for any given time and location coordinate within the multi-dimensional fabric. Therefore, each content item existing at each junction of time and location within the multi-dimensional fabric becomes uniquely identifiable and accessible with time and location coordinates. In some situations, additional dimensions may be used to further define each junction or to uniquely identify content. This allows the generation of a content network that enables the selection of content using time and location (and other optional dimensions). Likewise, the multi-dimensional fabric enables users to traverse and navigate this of content network using time and location (and other optional dimensions) to locate content.

The mobile computing devices 124a-124b (also referred to as mobile computing device 124) are configured as personal computing devices that are separate and remote from the remote server 102, which implement or execute a multi-dimensional fabric operating system 126a-126b, respectively (also referred to as multi-dimensional fabric operating system 126). Examples of mobile computing devices 124a-124b may include, but are not limited to, mobile devices, smartphones, tablets, laptop computers, or other portable computing devices. In some embodiments, the mobile computing device 124a may be a stationary computing device, such as a desktop computer, such that location or time, or both, are input by a user and not by movement of the computing device.

The multi-dimensional fabric operating system 126 may be implemented as an operating system, application, module, or other software or hardware implementation. The multi-dimensional fabric operating system 126 obtains or determines a location of the mobile computing device 124. The mobile computing device 124 may use a current physical location of the mobile computing device 124 (e.g., obtained from a GPS unit) or a virtual location that is input by a user. In some embodiments, the current location may be modified based on one or more preferences, such as within a select threshold radius of the current location or within a select distance in a current direction of travel. In some embodiments, the mobile computing device 124 may determine the location a single time, such as in response to user input. In other embodiments, the mobile computing device 124 may determine the location multiple times, such as at selected time intervals or in response to movement of the mobile computing device 124.

The multi-dimensional fabric operating system 126 may also select or determine a time associated with the mobile computing device 124. The time may be a current time or time input by the user. The time may be in the past, present, or future. In some embodiments, the mobile computing device 124 may determine the time a single time, such as in response to a user input. In other embodiments, the mobile computing device 124 may determine the time multiple times, such at selected time intervals or in response to movement of the mobile computing device 124.

In some embodiments, the mobile computing device 124 may also select or determine a topic, such as by user input or by use of one or more machine learning algorithms that are trained to identify content topics that the user is interested in. In some embodiments, the mobile computing device 124, or some other computing device, may analyzing data regarding the user's movement, use of the mobile computing device 124, time of use, etc. to identify potential content topics. As one such example, the multi-dimensional fabric operating system 126 may learn that the user routinely looks for food content around noon. Thus, if the current time is 11:00 AM, then the determined topic may be food. As another example, the multi-dimensional fabric operating system 126 may learn that the user routinely looks for new television shows to watch around 5:00 PM. Therefore, if the current time is 4:45 PM, then the determined topic may be entertainment.

The mobile computing device 124 sends or transmits the determined location and time (and optionally the topic) to the remote server 102. The multi-dimensional fabric operating system 104 on the remote server 102 can then use the received location and time information to determine location and time coordinates within the multi-dimensional fabric. The multi-dimensional fabric operating system 104 determines if there is content stored in the multi-dimensional fabric for those coordinates. If content is present, then the remote server 102 sends or transmits a notification to the multi-dimensional fabric operating system 126 on the mobile computing device 124 to be presented to the user of that mobile computing device 124. The notification may be a visual notification that is displayed to the user or it may be a haptic notification, such as a vibration of the mobile computing device 124.

In various embodiments, the user may select or interact with the notification to indicate that the user wishes to consume the content. In such an embodiment, the mobile computing device 124 sends or transmits a message to the multi-dimensional fabric operating system 104 on the remote server 102 to fetch or obtain the content from the determined location and time coordinate. The remote server 102 can then transmit the content to the mobile computing device 124 to be presented to the user. In some embodiments, the remote server 102 may respond to the mobile computing device 124 with the content, without interaction with the notification by the user or without first providing a notification.

The content may be visual content, audio content, or haptic content, which is output by the mobile computing device 124 via a display device, audible output interface, or haptic interface, respectively. As discussed in more detail below, the mobile computing device 124 may activate a camera associated with the mobile computing device 124 such that images captured by the camera can be augmented with the received content. The output device may be integrated into the mobile computing device 124, such as a built-in display screen or speaker, or it may be an output device that is separate from, but in communication with, the mobile computing device 124.

In some embodiments, the multi-dimensional fabric operating system 126 on the mobile computing device 124 may employ embodiments of the multi-dimensional fabric operating system 104 on the remote server 102 such that the mobile computing device 124 selects and outputs the content from the multi-dimensional fabric without the use of the remote server 102. In other embodiments, the mobile computing device 124 may provide general location information to the remote server 102 such that the multi-dimensional fabric operating system 104 determines the location and time associated with the mobile computing device 124 and transmits notifications and content to the mobile computing device 124 for presentation to the user of the mobile computing device 124.

As the location or time associated with the mobile computing device 124 changes, it can provide such changes to the remote server 102. The remote server 102 can respond by providing new notifications or content based on the changed location or time. A use-case example of the location changing is discussed in more detail below in conjunction with FIG. 4.

Figure 3:
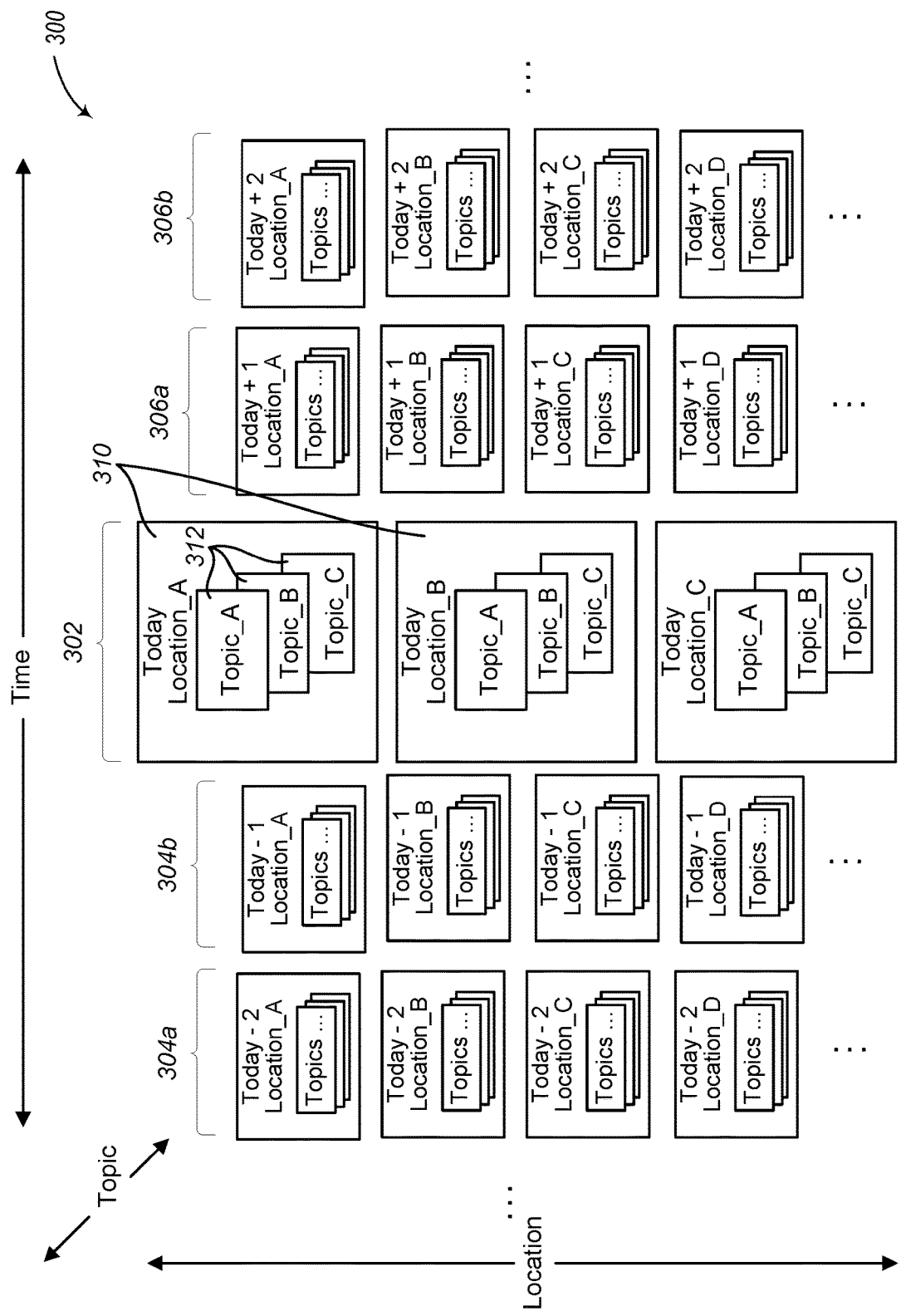

FIGS. 2 and 3 illustrate graphical representations of use case examples of a multi-dimensional fabric for storing content in accordance with embodiments described herein.

Example fabric 200 in FIG. 2 includes a time axis 202, a location axis 204, and a topic axis 206. Although fabric 200 utilizes time, location, and topic for its axes, embodiments are not so limited and other types of information associated with content may be used as the axes of fabric 200. Likewise, fabric 200 utilizes three dimensions, but other embodiments may utilizes more or fewer dimensions.

Moreover, although fabric 200 appears to be constrained in each axis, embodiments are not so limited. Rather, the fabric or graphical environment is flexible along the axes, while the coordinate is fixed. This allows for the fabric 200 to move in one or more directions for the identification and selection of content based on location and time of a user's mobile computing device, or location and time and topic. The movement of the fabric allows for the quicker selection and retrieval of subsequent content based on predicted changes to the location or time of the mobile computing device. Similarly, the movement of the fabric allows the system to select recommended content for the user. Although embodiments described herein refer to the movement of the fabric 200, embodiments are not so limited. In some embodiments, content can be directly accessed in the fabric 200 using the location and time associated with the user's mobile computing device, or the location and time and topic.

The time axis 202 may be arranged as a plurality of different time periods, such as minutes, hours, or days. As the time changes, whether by the advancement of time or by a user selection of a particular time, fabric 200 moves to a specific point along the time axis 202 associated with the current or selected time. In various embodiments, the current time period (e.g., today) is positioned in the middle column 208c. Accordingly, the fabric 200 can move along the time axis 202 as the current time period changes to keep content associated with the current time period in the middle column 208c. The time axis 202 may include past (e.g., columns 208a and 208b), present (e.g., column 208c), or future times (e.g., columns 208d and 208e). Thus, the fabric 200 can include content (e.g., an image) generated in the past, content as it is being generated, or content that is set in the future (e.g., a party invite or a restaurant's next weekend menu).

The location axis 204 may be arranged as a plurality of different locations, such as GPS coordinates, cities, zip codes, or other geographical segments. As a user moves, changes physical locations, or sets a virtual location, fabric 200 moves to a specific point along the location axis 204 associated with the current or selected location. In some embodiments, the locations are selected based on a distance from a current physical location of the mobile computing device. For example, locations closest to the mobile computing are arranged in the top row 210a and the locations furthest from the display device are arrange in the bottom row 210g. Accordingly, the fabric 200 can move along the location axis 204 as the current or selected location changes to keep content associated with the current or selected location at the top row 2010a.

The topic axis 206 may be arranged based on themes, tags, characteristics, or other information related to the substance of the content. For example, food content may be in layer 212a, entertainment content in layer 212b, transportation content in layer 212c, etc. In other embodiments, the topics may be arranged based on frequency of access to the user based on location or time. For example, if the user typically accesses food content at noon near downtown, then the topic axis may be arranged by food type (e.g., Mexican, Italian, Japanese, etc.) or restaurant type (e.g., sit-down dining, fast food, delis, etc.) or restaurant expense (e.g., cheap food, moderately priced food, expensive food, etc.). In some embodiments, a same piece of content may be positioned on multiple layers on the topic axis 206, while at the same time on the time axis 202 and the same location on the location axis 204.

As the user's location changes as a function of time, the system navigates the fabric 200 by moving the environment, or fabric, to a specific content or item, or group of multiple content or items, based on the Time (when)+Location (where)+Topic (what). By configuring the content in the fabric based on multiple dimensions (e.g., Where and when, or What/When/Where), the fabric provides a pre-configured scaffold that allows the selection of content to present to the user without the system fetching and organizing the content. Rather, the fabric makes selecting and discovering content immediately accessible based on changes of time, location, or topic.

The fabric 200 illustrates a plurality of icons 214 that each represent separate content (also referred to as content 214). The content 214 is laid out in a plurality of time periods 208a-208e (columns), a plurality of locations 210a-210g

(rows), and a plurality of topics 212a-212d (layers), using coordinates associated with the separate dimensions. For any given point defined by two or more dimensions (e.g., What, When, Where), there is a finite amount of content or data. As a result, the fabric 200 adjusts as the What, When, and Where change, which changes the content to be selected and presented to the user. Although the icons 214 are illustrated in a grid-like pattern, embodiments are not so limited. In some embodiments, the positioning of the icons 214 may be dependent on the granularity of the axes 202, 204, and 206, as well as the availability of content at those granularity levels.

In some embodiments, the location rows 210, time columns 208, and topic layers may be independent from one another such that a single axis can be manipulated. For example, as a user walks down a street, fabric 200 may adjust along the location axis 204 based on the current physical location of the mobile device without affecting the other axes or layers. The user may independently select a time on the time axis 202. In other embodiments, two or more axes can be manipulated. For example, as the user walks down the street and as time passes, the fabric 200 may adjust along both the location axis 204 and the time axis 202. By providing adjusting the fabric 200 along one or more axes, the system can move the fabric 200 to access content for a specific time, a specific location, and a specific topic for a specific mobile computing device.

As a visual representation, the fabric 200 may look two dimensional to a user, but is actually three dimensional, such that when a two-dimensional point is selected by the user, the user can switch axes to view the third dimension. And although FIG. 2 shows the time axis 202 and the location axis 204 on this top-level two-dimensional view, other combinations of axes may also be used, e.g., time v. topic, location v. topic, or other non-illustrated axes.

Example fabric 300 in FIG. 3 is similar to fabric 200 in FIG. 2. Various embodiments described herein refer to the selection and presentation, or notification, of content to a user based on a user's current position and time. FIG. 3, however, represents at graphical representation of the fabric as it could be displayed to a user.

In this example illustration, the current time period 302 is illustrated in a middle column with future time periods 306a-306b to the right of the current time period 302 and past time periods 304a-304b to the left of the current time period. Each location 310 in the current time period 302 includes a plurality of topics 312. These topics 312 are similar to the layers 212 in FIG. 2. The user can move or manipulate the fabric 300 along one or more axes to a particular piece of content, which also changes the graphical representation of the fabric.

Figure 4A:
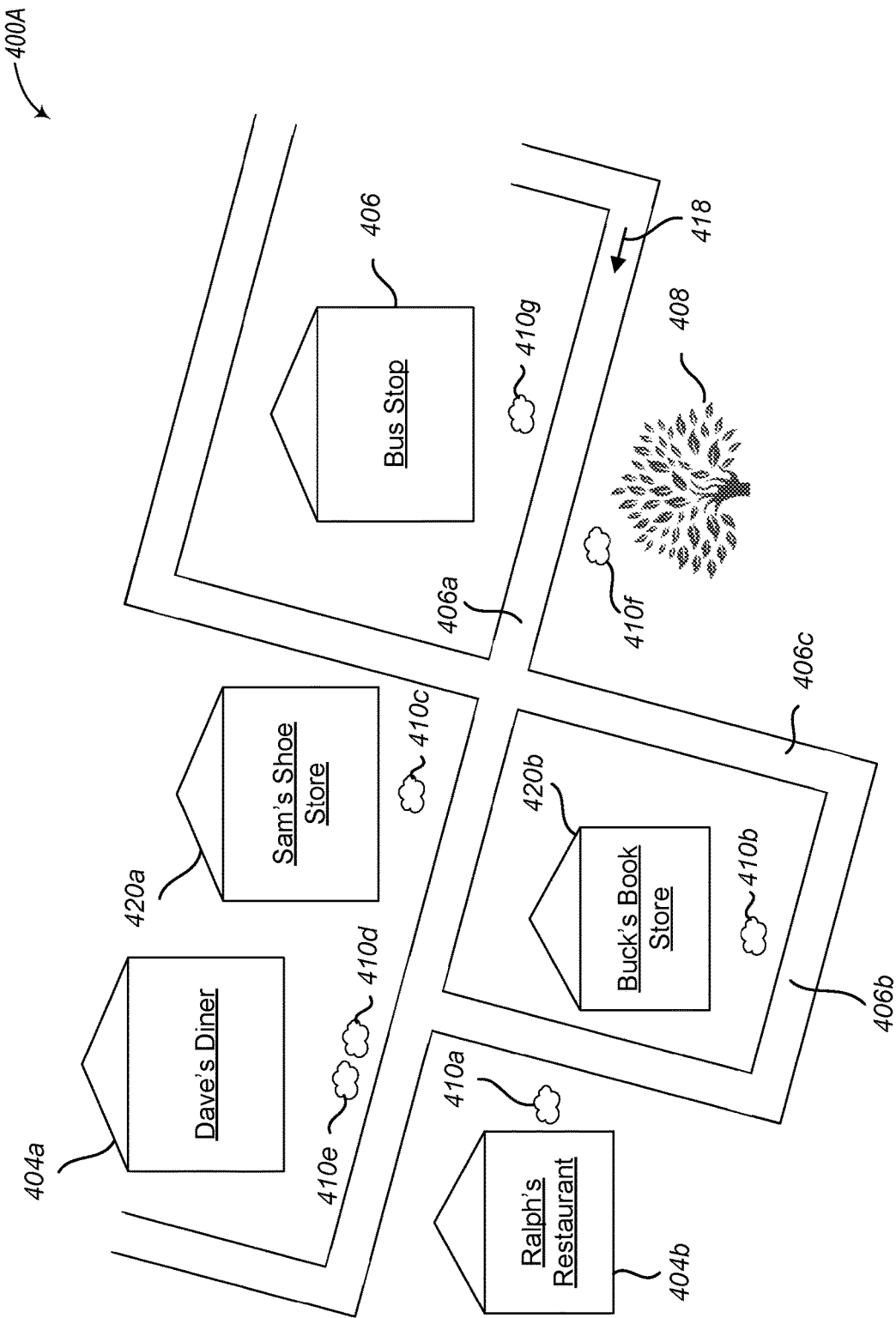
FIGS. 4A-4B illustrate graphical examples of a geographical area that is used to provide content to a user using a multi-dimensional fabric in accordance with embodiments described herein.
Figure 4B:
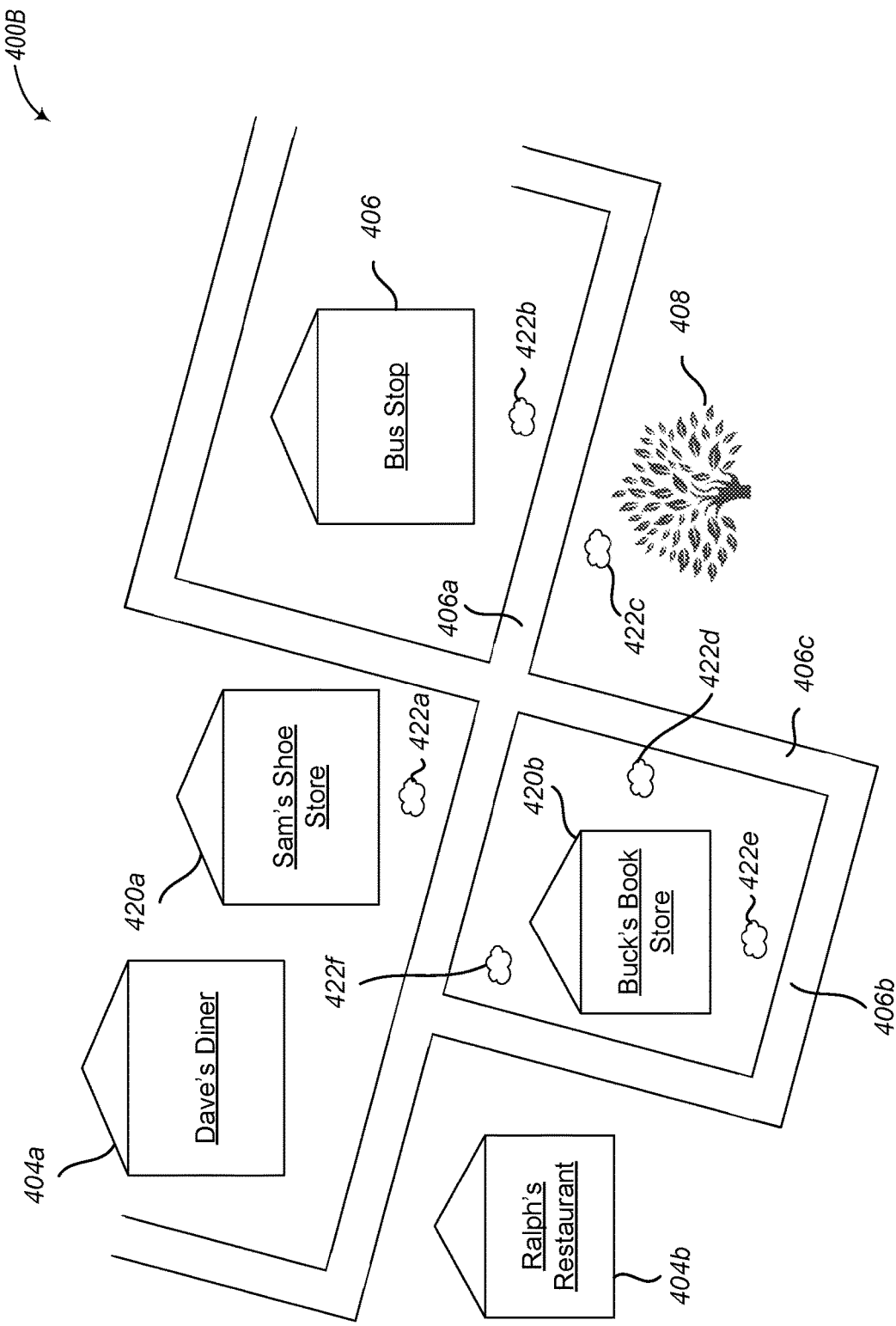

FIG. 4A-4B illustrate graphical examples of a geographical area that is used to provide content to a user using a multi-dimensional fabric in accordance with embodiments described herein. FIG. 4A shows content locations during a first time period and FIG. 4B shows content locations during a second time period that is different from the first time period. As one example, FIG. 4A may show content locations at a current time of 12:00 PM on a particular Tuesday and FIG. 4B may show content locations at a current time of 10:00 AM on a particular Saturday.

Example 400A in FIG. 4A shows a map of a neighborhood that includes a plurality of streets 406a-406c and a number different establishments. The establishments include restaurants 404a-404b, stores 420a-420b, a bus stop 406, and a memorial tree 408. Also shown in example 400A are content locations 410a-410g. The content locations 410a-410g are shown in the figure, but the content would not otherwise be viewable in the neighborhood by a user, except when presented to the user on a mobile computing device as described herein. The streets, establishments, and content locations are not limiting and are shown as examples of using a multi-dimensional fabric to notify users of content when the user approaches or is at a particular content location during a particular time.

As described herein, content is stored in the multi-dimensional fabric according to location and time associated with the content. Therefore, the content locations 410a-410g are positioned based on the location of the corresponding content at the current time (e.g., 12:00 PM on a particular Tuesday, as mentioned above). In this example, the content at content locations 410a-410g are as follows:

Content location 410a is associated with a lunch menu for restaurant 404b;

Content location 410b is associated with a review of store 420b;

Content location 410c is associated with an advertisement for store 420a;

Content location 410d is associated with a lunch menu for restaurant 404a;

Content location 410e is associated with a review of restaurant 404a;

Content location 410f is associated with a tribute and story of memorial tree 408; and Content location 410g is associated with a lunch-time bus schedule for bus stop 406.

Assume the user is walking down street 406 in the direction of arrow 418. The user's mobile computing device tracks the user's location as the user walks down the street and provides it to the remote sever. The remote server queries the multi-dimensional fabric to determine if content is stored in the multi-dimensional fabric at the user's current location, or within a selected distance from the user's current location, in conjunction with the current time. If no content is identified in the multi-dimensional fabric then the remote server does not provide any content to the mobile computing device.

When the user arrives at the content location 410g and the remote server determines that there is content stored in the multi-dimensional fabric at that location for the current time, the remote server sends a notification to the user's mobile computing device to be presented to the user. This notification indicates that there is content present at content location 410g for the current time. In some embodiments, the notification may include a preview or general information regarding the content, such as what the content includes (e.g., "bus stop schedule"). If the user wishes to view the content, then the user can click on the notification to request the content. The user's mobile computing device sends a request to the remote server for the content at content location 410g. The remote server responds by sending the bus stop schedule to the mobile computing device, and the mobile computing device displays the bus stop schedule to the user. If the user does not want to view the content, then the user can ignore the notification or select to dismiss it.

The system can present another notification to the user when the user arrives at content location 410f. Again, the user can select to view the content or to dismiss the notification and not view the content. As the user walks down any of streets 406a-406c, the system presents notifications and content to the user on the user's mobile computing device when the user arrives at one of the content locations 410a-410g. In this way, the user is notified of an advertisement for store 420a when the user is in front of the store 420*a*. Similarly, the user is notified of a lunch menu for restaurant 404*b* when the user is in front of the restaurant 404*b*.

As discussed herein, the current location of the user may be the physical location of the user or it may be a select distance in a current direction of travel. For example, when the is user walking on street 406*a* in the direction of arrow 418 and passes the content location 410*f*, the system may look ahead in the direction of travel and identify content location 410*c* in the multi-dimensional fabric as storing the advertisement for store 420*a*. In some embodiments, the system may notify the user of the content at content location 410*c* just after the user passes content location 410*f*. In other embodiments, the system may wait until the user is within a select distance from the content location 410*c*. In this way, the user is not presented with a notification for content at content location 410*c* if the user turns left on street 406*c*.

Although the examples discussed above are based on the user walking down the street, embodiments are not so limited. In some embodiments, a virtual location of the user may be used. For example, the user may search for restaurant 404*a*, which may be used as the location of the user. Thus, the system may identify content locations 410*d* and 410*e* as being at that location. In this way, the user can be notified of the restaurant's menu and review. As another example, the user could use a virtual reality system or a cursor to "walk" down the street and view content at the various content locations.

As discussed herein, the multi-dimensional fabric stores content based on location and time. Thus, when the time changes, so to may the content that is stored at the various locations within the neighborhood.

Example 400B in FIG. 4B shows a map of the neighborhood from FIG. 4A, but at a second time period, such as a current time of 10:00 AM on a particular Saturday. Similar to example 400A in FIG. 4A, example 400B includes streets 406*a*-406*c*, restaurants 404*a*-404*b*, stores 420*a*-420*b*, a bus stop 406, and a memorial tree 408.

Because the time has changed, so too has the content that is available from the multi-dimensional fabric. Example 400B includes content locations 422*a*-422*f*. In this example, the content at content locations 422*a*-422*f* are as follows:

Content location 422*a* is associated with a Saturday special advertisement for store 420*a*;

Content location 422*b* is associated with weekend bus schedule for bus stop 406;

Content location 422*c* is associated with a tribute and story of memorial tree 408; and Content location 422*d*, 422*e*, and 422*f* are associated with an advertisement for store 420*b*.

Similar to what is discussed above and by employing embodiments described herein, as the user walks down any of streets 406*a*-406*c*, the system can present notifications and content to the user when the user arrives at a content location 422*a*-422*f*. The content available and presented to the user in this example may be different from what was available and presented in example 400A in FIG. 4A because the time has changed and the multi-dimensional fabric stores content based on location and time associated with the content.

The operation of certain aspects of the disclosure will now be described with respect to FIG. 5. In at least one of various embodiments, process 500 described in conjunction with FIG. 5 may be implemented by or executed by a system of one or more computing devices, such as mobile computing device 124 or remote server 102 in FIG. 1.

Figure 5:
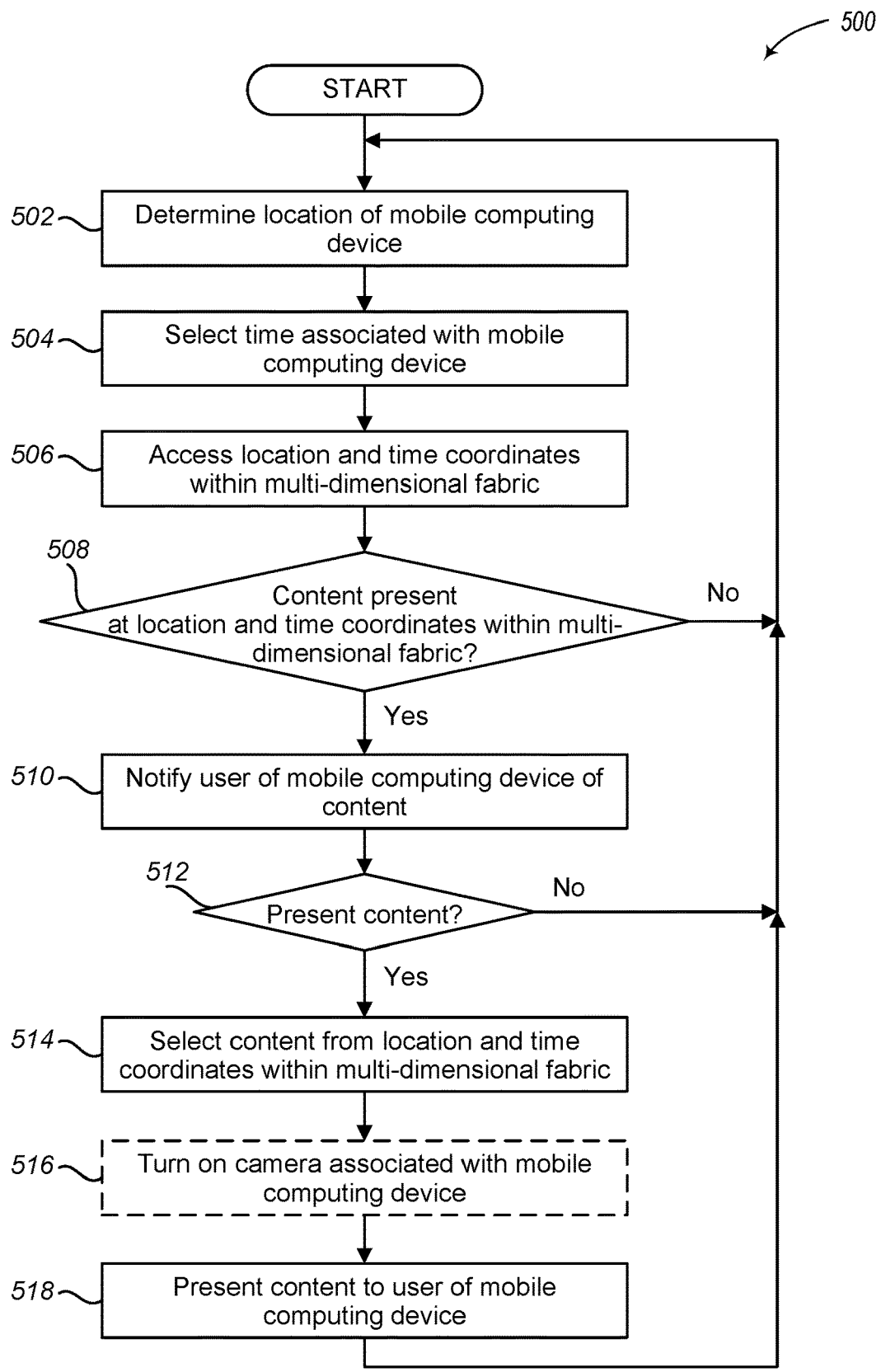
FIG. 5 illustrates a logical flow diagram generally showing one embodiment of a process for selecting content using a multi-dimensional fabric and presenting that content to a user in accordance with embodiments described herein.

FIG. 5 illustrates a logical flow diagram generally showing one embodiment of a process for selecting content using a multi-dimensional fabric and presenting that content to a user in accordance with embodiments described herein.

Process 500 begins, after a start block, at block 502, where a location of the mobile computing device is determined. The location may be a physical location (e.g., a current geographic location) or a virtual location (e.g., a user-selected geographic location) of the mobile computing device. In various embodiments, the location determination and the location granularity may be set or selected by the user as one or more preferences.

In some embodiments, the location is a physical geographical location of the mobile computing device. In at least one embodiment, the physical geographical location may be obtained from a Global Positioning System (GPS) unit on the mobile computing device. In at least one other embodiment, a user may input the physical geographical location of the mobile computing device, which may be a mailing address, GPS coordinates, street intersection, city, etc. In other embodiments, the physical geographical location may be determined based on a known starting location and subsequent movement from the starting location. Such movement may be determined based on data output from one or more accelerometers or other motion-detection sensors on the mobile computing device.

In at least some embodiments, the location may be a physical geographical location that is within a preselected distance from the current physical geographical location of the mobile computing device. For example, the location may be set as an area having a preselected radius (e.g., 10 meters) surrounding the mobile computing device. In other embodiments, the location may be a physical geographical location that is within a preselected distance of the current physical geographical location but set in front (e.g., within a preselected angular heading) of a current direction of travel of the mobile computing device. In some embodiments, these distances may be set as physical distance measurements. In other embodiments, the distances may be set as time of travel, such as based on a current or average speed of the mobile computing device, based on a preselected speed, based on current traffic conditions, etc.

In some other embodiments, the location is a virtual location of the mobile computing device. In at least one embodiment, the virtual location is input by a user, such as if the user wanted to see content at a particular location. In at least one other embodiment, the virtual location is obtained from a search or request for content. As one such example, if the user used a search engine to see a current lunch menu of a particular restaurant, then the physical location of the restaurant is obtained and used as the virtual location of the mobile computing device. As another example, if the user wanted to see when the next football game is scheduled, then the user could input the name of the stadium and the physical address of the stadium may be used. In some embodiments, the virtual location may include a preselected distance (e.g., 10 meters) from the user-selected location.

In some embodiments where process 500 is executed by a remote server, the mobile computing device may transmit or send the location of the mobile computing device, whether a physical location or a virtual location, to the remote server. The mobile computing device may transmit its location to the remote server at select time periods; in response to a change in location, time, or topic; or in response to a request from the remote server.

Process 500 proceeds to block 504, where a time associated with the mobile computing device is selected. In some embodiments, the time is the current time at the location determined at block 502. In other embodiments, the time is provided or selected by the user. The time may be an exact time or a time range. The time may be in the past, present, or future. For example, if the user wanted to see tomorrow's lunch menu of a particular restaurant, then tomorrow from 11:00 am to 1:00 pm may be used as the time. As another example, if the user wanted to see a score of a football game, then the time would be the time of when the game was played. In various embodiments, the time selection, and the time granularity (e.g., minutes, hours, days, etc.), may be set or selected by the user as one or more preferences. In some embodiments where process 500 is executed by a remote server, the time of the mobile computing device may be obtained by the remote server from the mobile computing device.

Process 500 continues at block 506, where location and time coordinates within the multi-dimensional fabric are accessed based on the determined location and the selected time. In some embodiments, a single location/time coordinate may be selected and accessed. The use of location/time coordinate nomenclature refers to a particular location coordinate on the location axis of the multi-dimensional fabric and a time particular time coordinate on the time axis in the multi-dimensional fabric, where the particular location coordinate is determined based on the location of the mobile computing device determined at block 502 and the particular time coordinate is determined based on the time selected at block 504.

For example, the location/time coordinate of latitude_A, longitude_B/12:00 pm MDT within the multi-dimensional fabric may be accessed. In other embodiments, a range of location/time coordinates may be selected. For example, the location/time coordinate of City_Y/Jun. 3, 2021 may be selected and accessed. In both of these examples, the multi-dimensional fabric may store content having a granularity of GPS coordinates and time of day (to the hour). However, other location/time coordinate granularities may also be used.

Process 500 proceeds next to decision block 508, where a determination is made whether there is content present at the location and time coordinates within the multi-dimensional fabric. If a single location/time coordinate is accessed, then the system determines if content is stored in the multi-dimensional fabric having that location/time coordinate. If a range or plurality of location/time coordinates is accessed, then the system determines if one or more content is stored in the multi-dimensional fabric having a location/time coordinate within the range. If content is present, process 500 flows to block 510; otherwise, process 500 loops to block 502 to determine a new location of the mobile computing device.

At block 510, the user of the mobile computing device is notified of the presence of content at the determined location for the selected time. In some embodiments, a push notification is sent to or presented on the mobile computing device to indicate that content is available for that location/time coordinate. In this way, the user is notified that they are near the geographical location of content for a particular time. As one example, as the user is walking down the street, when the user approaches a particular restaurant at noon and that restaurant has posted a menu to its location for noon, then the user is notified that there is a menu available to view for that restaurant.

In some embodiments, the notification may be a visual notification that is displayed to the user via a display device associated with the mobile computing device. In other embodiments, the notification may be an audible notification that is output to the user via a speaker associated with the mobile computing device. In yet other embodiments, the notification may be a haptic notification that is presented to the user via a vibrating or other haptic output. The notification may be a single type of notification (e.g., a visual notification) or the notification may be multiple types of notifications (e.g., a visual notification and a haptic notification).

In some embodiments where process 500 is executed by a remote server, the remote server may transmit or send the notification to the mobile computing device for display or presentation to the user by the mobile computing device.

In some embodiments, block 510 may be optional and may not be performed. In which case, the content may be selected and obtained for presentation without first presenting a notification to the user.

Process 500 continues at decision block 512, where a determination is made whether the content is to be obtained via the multi-dimensional fabric and presented to the user of the mobile computing device. In some embodiments, the user can select to obtain and view the content by clicking on or selecting the content through the notification. In other embodiments, the content is automatically obtained for presentation to the user on the mobile computing device. If the content is to be obtained, then process 500 flows to block 514; otherwise, process 500 may loop to block 502 to determine a new location and select a new time.

At block 514, content is selected and obtained from the location and time coordinates within the multi-dimensional fabric. As noted above, the location/time coordinate may be a single location/time coordinate within the multi-dimensional fabric, or it may be a range within the multi-dimensional fabric. If content is stored in the multi-dimensional fabric at a single location/time coordinate, then there is a single piece of content selected for presentation to the user of the mobile computing device. If the location/time coordinate is a range of location/time coordinates, then a plurality of content that corresponds to the various combinations of location/time coordinates within the range is selected.

Process 500 proceeds to block 516, where a camera associated with the mobile computing device is turned on. Turning on the camera enables the mobile computing device to capture images or video in which to augment with the content. In some embodiments, the camera may be embedded in the mobile computing device. In other embodiments, the camera may be separate from, but in communication with the mobile computing device. In some embodiments where process 500 is executed by a remote server, then the remote server may transmit an instruction to the mobile computing device indicating that the mobile computing device is to turn on or activate the camera. In various embodiments, block 516 may be optional and may not be performed.

Process 500 continues next at block 518, where the selected content is presented to the user of the mobile computing device. In some embodiments, the content is displayed via a display device on the mobile computing device. In other embodiments, the content is displayed via a display device that is separate from, but in communication with the mobile computing device, such as ocular glasses that can display images to the wearer. In yet other embodiments, the presentation of the content may include audio or haptic content that is output or presented to the user.

In at least some embodiments, the images or video captured by the camera at block 516 may be augmented with the content. For example, the images may be edited or modified to include the content or the content may be overlaid on the images and displayed to the user. In some embodiments, additional location or positioning information of the camera may be utilized in conjunction with the location information associated with the content to augment the captured images with the content. For example, the location of the content may be compared to the current location of the mobile computing device and a direction of capture by the camera. If the camera is directed towards the location of the content, then the images may be augmented with the content. But if the camera is directed towards some other location, then the images may not be augmented with the content until the direction of the camera changes to be directed towards the location of the content. In some other embodiments, the content may include metadata that details how the mobile computing device is to augment the images with the content. For example, if the content is a menu of a restaurant, then the menu may include instructions for the mobile computing device to augment an image of the restaurant to display the menu as appearing on a wall of the restaurant.

After block 518, process 500 loops to block 502 to determine a new location and select a new time associated with the mobile computing device. By looping to block 502, process 500 can repeat to dynamically select and present new content to the user as the location or time of the mobile computing device dynamically changes over time.

Figure 6:
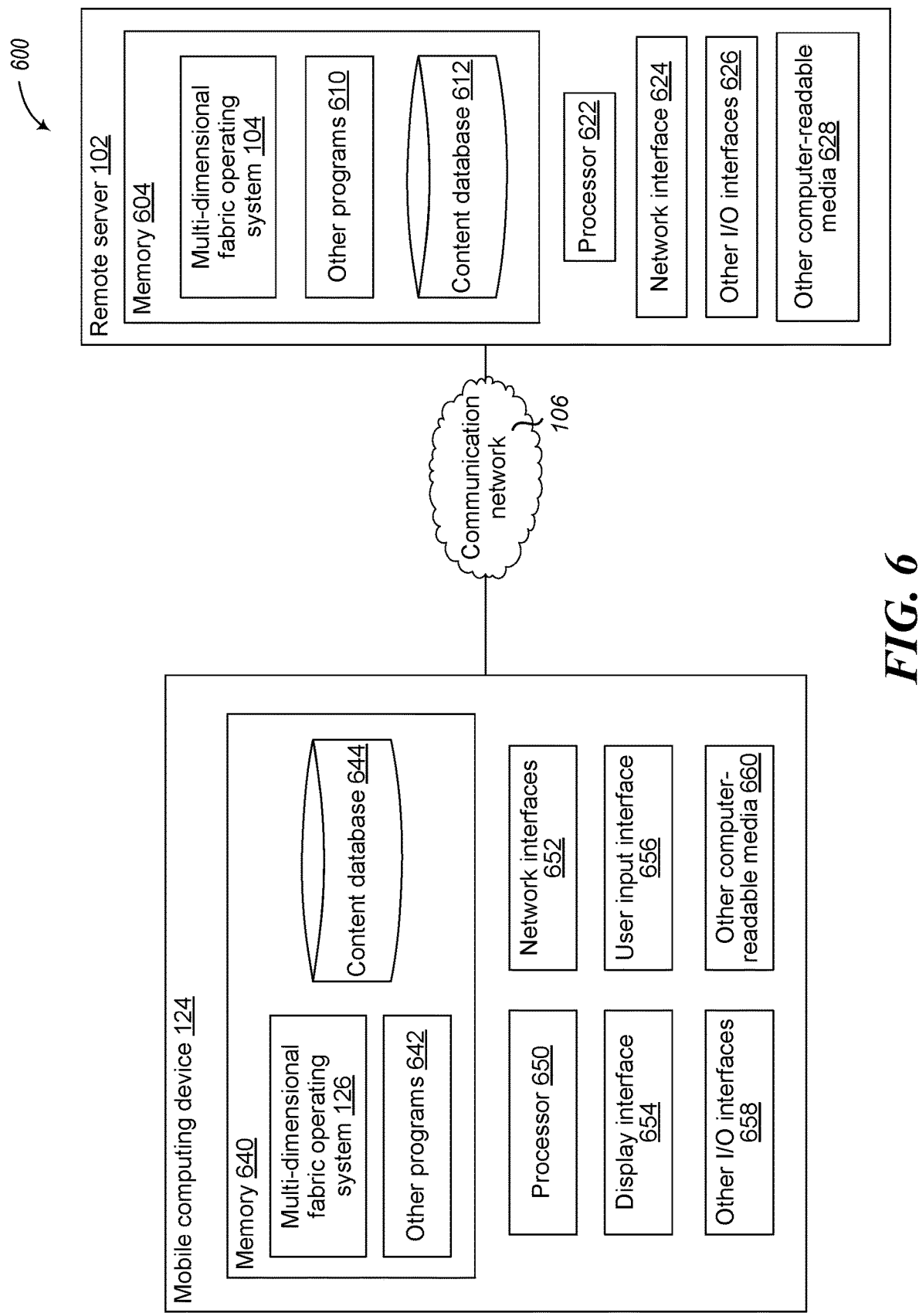
FIG. 6 shows a system diagram that describes one implementation of computing systems for implementing embodiments described herein.

FIG. 6 shows a system diagram that describes one implementation of computing systems for implementing embodiments described herein. System 600 includes remote server 102 and one or more mobile computing devices 124.

As described herein, the remote server 102 is a computing device that can perform functionality described herein for managing a multi-dimensional fabric of content and presenting content to the mobile computing device 124 based on a location and time associated with the mobile computing device 124. One or more special purpose computing systems may be used to implement the remote server 102. Accordingly, various embodiments described herein may be implemented in software, hardware, firmware, or in some combination thereof. The remote server 102 includes memory 604, one or more processors 622, network interface 624, other input/output (I/O) interfaces 626, and other computer-readable media 628. In some embodiments, the remote server 102 may be implemented by cloud computing resources.

Processor 622 includes one or more processing devices that execute computer instructions to perform actions, including at least some embodiments described herein. In various embodiments, the processor 622 may include one or more central processing units ("CPU"), programmable logic, or other processing circuitry.

Memory 604 may include one or more various types of non-volatile or volatile storage technologies. Examples of memory 604 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 604 may be utilized to store information, including computer-readable instructions that are utilized by processor 622 to perform actions, including at least some embodiments described herein.

Memory 604 may have stored thereon multi-dimensional fabric operating system 104. The multi-dimensional fabric operating system 104 manages content stored in accordance with a multi-dimensional fabric and accesses the content based on a location and time associated with the mobile computing device 124, as described herein.

Memory 604 may include a content database 612 for storing content in accordance with the multi-dimensional fabric. Memory 604 may also store other programs 610. The other programs 510 may include other operating systems, user applications, or other computer programs.

Network interfaces 624 is configured to communicate with other computing devices, such as mobile computing device 124, via a communication network 106. Network interfaces 624 include transmitters and receivers (not illustrated) to send and receive data associated with the multi-dimensional fabric described herein.

Other I/O interfaces 626 may include interfaces for various other input or output devices, such as audio interfaces, other video interfaces, USB interfaces, physical buttons, keyboards, haptic interfaces, tactile interfaces, or the like. Other computer-readable media 628 may include other types of stationary or removable computer-readable media, such as removable flash drives, external hard drives, or the like.

The mobile computing device 124 is a computing device that is remote from remote server 102 and can perform functionality described herein for presenting content to a user based on a location and time associated with the mobile computing device 124. In various embodiments, the mobile computing device 124 obtains the content from the remote server 102. One or more special-purpose computing systems may be used to implement the mobile computing devices 124. Accordingly, various embodiments described herein may be implemented in software, hardware, firmware, or in some combination thereof.

The mobile computing device 124 includes memory 640, one or more processors 650, network interfaces 652, display interface 654, user input interface 656, other input/output (I/O) interfaces 658, and other computer-readable media 660. The memory 640, processor 650, network interfaces 652, other I/O interfaces 658, and other computer-readable media 660 may be similar to, include similar components, or incorporate embodiments of memory 604, processor 622, network interface 624, other I/O interfaces 626, and other computer-readable media 628 of remote server 102, respectively. Thus, processor 650 includes one or more processing devices that execute computer instructions to perform actions, including at least some embodiments described herein. In various embodiments, the processor 650 may include one or more CPUs, programmable logic, or other processing circuitry.

Memory 640 may include one or more various types of non-volatile and/or volatile storage technologies. Memory 640 may be utilized to store information, including computer-readable instructions that are utilized by processor 650 to perform actions, including at least some embodiments described herein. Memory 650 may store various modules or programs, including multi-dimensional fabric operating system 126. The multi-dimensional fabric operating system 126 may perform embodiments similar to multi-dimensional fabric operating system 104 on the remote server 102. Accordingly, memory 640 may also store content database 644, which may be similar to content database 612 on remote server 102. In some embodiments, the multi-dimensional fabric operating system 126 may not maintain the multi-dimensional fabric but may obtain content from the multi-dimensional fabric operating system 104 on the remote server 102. Memory 640 may also store other programs.

Display interface 654 is configured to output images, content, or information to a user via a display device (not shown). Such a display device may include, but are not limited to, LCD screens, LEDs or other lights, or other types of display devices.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A method, comprising:
   accessing, by mobile computing device, a location and time coordinate within a multi-dimensional fabric for a target location and a target time, wherein corresponding digital content is stored on a location axis and a time axis of the multi-dimensional fabric based on a location and a time associated with the corresponding digital content; and
   in response to digital content being stored at the location and time coordinate within the multi-dimensional fabric, presenting, by the mobile computing device, the digital content to a user of the mobile computing device.

2. The method of claim 1, further comprising:
   determining a physical location of the mobile computing device;
   determining a direction of travel of the mobile computing device; and
   estimating the current location of where the mobile computing device will be in a selected amount of time or distance based on the physical location and the direction of travel of the mobile computing device.

3. The method of claim 1, further comprising:
   in response to the digital content being stored at the location and time coordinate within the multi-dimensional fabric, notifying the user of the mobile computing device that the digital content is available at the current location prior to presenting the digital content to the user.

4. The method of claim 3, wherein presenting the digital content to the user further comprises:
   presenting the digital content to the user in response to receiving user input to view the digital content after the user is notified that the digital content is available at the current location.

5. The method of claim 1, further comprising:
   receiving a user-selected time range as the target time.

6. The method of claim 1, further comprising:
   setting the target time as a current time at the target location.

7. The method of claim 1, further comprising:
   receiving a user-selected location as the target location.

8. The method of claim 1, further comprising:
   receiving a user-selected area as the target location.

9. The method of claim 1, further comprising:
   setting the target location as a current location of the mobile computing device.

10. The method of claim 1, further comprising:
    setting the target location as an estimated location of the mobile computing device.

11. The method of claim 1, further comprising:
    setting the target location as an area having a radius about a current location of the mobile computing device.

12. A computing device, comprising:
    a memory that stores computer instructions; and
    a processor that, when executing the computer instructions, causes the computing device to:
       query a location and time coordinate within a multi-dimensional fabric for a target location and a target time, wherein corresponding digital content is stored on a location axis and a time axis of the multi-dimensional fabric using a location and a time of the corresponding digital content; and
       provide digital content to a user of the mobile computing device in response to the digital content being stored at the location and time coordinate within the multi-dimensional fabric.

13. The computing device of claim 12, wherein the processor, when executing the computer instructions, further causes the computing device to:
    notify the user of the mobile computing device that the digital content is available at the current location in response to the digital content being stored at the location and time coordinate within the multi-dimensional fabric and prior to the digital content being provided to the user.

14. The computing of claim 13, wherein the processor, when executing the computer instructions to provide the content to the mobile computing device, further causes the computing device to:
    provide the digital content to the user in response to receiving user input to view the digital content after the user is notified that the digital content is available at the current location.

15. The computing device of claim 12, wherein the processor, when executing the computer instructions, further causes the computing device to:
    receive a user-selected time range as the target time.

16. The computing device of claim 12, wherein the processor, when executing the computer instructions, further causes the computing device to:
    set the target time as a current time at the target location.

17. The computing device of claim 12, wherein the processor, when executing the computer instructions, further causes the computing device to:
    receive a user-selected area as the target location.

18. The computing device of claim 12, wherein the processor, when executing the computer instructions, further causes the computing device to:
    set the target location as a current location of the mobile computing device.

19. The computing device of claim 12, wherein the processor, when executing the computer instructions, further causes the computing device to:
    set the target location as an estimated location of the mobile computing device.

20. A system, comprising:
    a database configured to store a plurality of digital content on a multi-dimensional fabric that includes a location axis and a time axis, wherein corresponding digital content of the plurality of digital content is stored at location/time coordinates on the location axis and the time axis based on a location and a time associated with the corresponding digital content; and a computing system configured to:
receive, from a mobile computing device, a request to access a target location/time coordinate within the multi-dimensional fabric for a target location and a target time; and
in response to digital content being stored at the target location/time coordinate within the multi-dimensional fabric, provide the digital content stored at the target location/time coordinate to the mobile computing device for presentation to a user of the mobile computing device.

* * * * *